United States Patent [19]
Zittel et al.

[11] Patent Number: 5,517,906
[45] Date of Patent: May 21, 1996

[54] METHOD AND APPARATUS FOR REMOVING WATER FROM POUCHES

[75] Inventors: David R. Zittel; William D. Zittel, both of Columbus, Wis.

[73] Assignee: Lyco Manufacturing, Inc., Columbus, Wis.

[21] Appl. No.: 388,676

[22] Filed: Feb. 14, 1995

[51] Int. Cl.⁶ ........................................................ A23L 3/00
[52] U.S. Cl. ........................ 99/536; 15/313; 15/302; 15/309.2; 15/345; 99/352; 99/484; 134/63; 134/66
[58] Field of Search .............................. 99/352, 484, 516, 99/517, 534–536, 403–409; 15/3.12, 3.13, 302, 309.2, 345; 134/15, 21, 32, 37, 39, 69, 63, 66–68; 426/518, 506

[56] References Cited

U.S. PATENT DOCUMENTS

| | | | |
|---|---|---|---|
| 3,223,024 | 12/1965 | Benson et al. | 99/352 |
| 3,276,065 | 10/1966 | King, Jr. et al. | 15/345 |
| 3,793,937 | 2/1974 | Lipoma | 99/404 |
| 3,968,818 | 7/1976 | Gerrans | 99/537 |
| 4,198,725 | 4/1980 | Trutzschler | 15/306 |
| 4,251,895 | 2/1981 | Caridis et al. | 15/3.13 |
| 4,372,200 | 2/1983 | Caridis et al. | 99/407 |
| 4,438,977 | 3/1984 | Chapel | 15/345 |
| 4,477,287 | 10/1984 | Kush et al. | 134/15 |
| 4,549,478 | 10/1985 | Entes | 99/536 |
| 4,670,936 | 6/1987 | Hanson | 15/309.2 |
| 4,676,006 | 6/1987 | Tolson | 15/309.2 |
| 4,738,193 | 4/1988 | Benson et al. | 99/404 |
| 4,942,810 | 7/1990 | Zittel et al. | 99/516 |
| 5,097,755 | 3/1992 | Hill | 99/484 |
| 5,174,829 | 12/1992 | Gray | 134/21 |
| 5,287,586 | 2/1994 | Dentzau | 15/345 |
| 5,425,308 | 6/1995 | Dickerson et al. | 99/536 |

Primary Examiner—Timothy F. Simone
Attorney, Agent, or Firm—Lathrop & Clark

[57] ABSTRACT

The water is removed from food product pouches which have passed through a water bath by advancing the pouches in a continuous stream on a first tray which is vibrated with respect to a frame. The pouches are advanced beneath an air manifold which discharges air onto the pouch to blow moisture downwardly. An air outlet is formed in the tray beneath the air manifold, and air is drawn therethrough. The reduced pressure produced by the partial vacuum restrains the pouch from upstream motion, and serves to draw away the water which has been detached from the pouch. A second vibrating tray is positioned to receive pouches discharged from the first tray. An inclined ramp flips the pouches as they travel between the trays to present the underside of the pouch for drying. Once flipped the pouches progress along the second tray beneath a second air manifold and vacuum air outlet to complete the water removal prior to discharging the pouch from the apparatus.

5 Claims, 4 Drawing Sheets

5,517,906

METHOD AND APPARATUS FOR REMOVING WATER FROM POUCHES

FIELD OF THE INVENTION

The present invention relates to food processing apparatus in general, and to apparatus for drying wet pouches containing food product in particular.

BACKGROUND OF THE INVENTION

Food products are sometimes subjected to heating and cooling while enclosed in sealed packets or pouches. Such pouches permit a liquid or semiliquid product such as ketchup or soup, or prepared quantities of product, to be treated in a continuous process. Pouches are commonly treated to heating or cooling in water baths, and are advanced by belt, auger or other means through various conditions until the food reaches the desired end state.

Treated food pouches are then packaged for storage or shipment. Because the pouches are packed in corrugated paperboard containers, it is important that no water remain on the pouches which might compromise the integrity of the corrugated containers. Furthermore, excess water on the pouch surfaces will require additional cooling cost if the pouches are refrigerated or frozen. It is thus essential that the pouches which leave the treating water bath be fully dried prior to packaging.

A common method of obtaining the requisite dryness is to station operators with cloth towels on the packaging line to manually remove unwanted moisture. In addition to the drawbacks of inconsistency in drying of a manual operation, the complications and cost of staffing and managing the dryers present an added burden and add to the end cost of the food product.

Simple ducted jets of air blown onto the pouches provide unacceptable results, due to the tendency of the pouches to be blown upstream, and the water droplets from one pouch to be blown onto the succeeding pouch.

What is needed is an apparatus which automatically removes moisture from food product pouches in an economical and consistent fashion.

SUMMARY OF THE INVENTION

The apparatus of this invention removes water from food product pouches which have passed through a water bath by advancing the pouches in a continuous stream on a first tray which is vibrated with respect to a frame. The pouches are advanced beneath an air manifold which discharges air onto the pouch to blow moisture downwardly. An air outlet is formed in the tray beneath the air manifold, and air is drawn therethrough. The reduced pressure produced by the partial vacuum restrains the pouch from upstream motion, and serves to draw away the water which has been detached from the pouch. A second vibrating tray is positioned to receive pouches discharged from the first tray. An inclined ramp flips the pouches as they travel between the trays to present the underside of the pouch for drying. Once flipped the pouches progress along the second tray beneath a second air manifold and vacuum air outlet to complete the water removal prior to discharging the pouch from the apparatus.

It is an object of the present invention to provide a pouch moisture removal apparatus which automatically removes accumulated moisture from food product pouches prior to packaging.

It is another object of the invention to provide an apparatus which removes adhered moisture from all surfaces of a food product pouch.

It is a further object of the present invention to provide an apparatus which advances food product pouches while removing water from the surfaces thereof.

Further objects, features and advantages of the invention will be apparent from the following detailed description when taken in conjunction with the accompanying drawings.

DESCRIPTION OF THE PREFERRED EMBODIMENT

Figure 1:
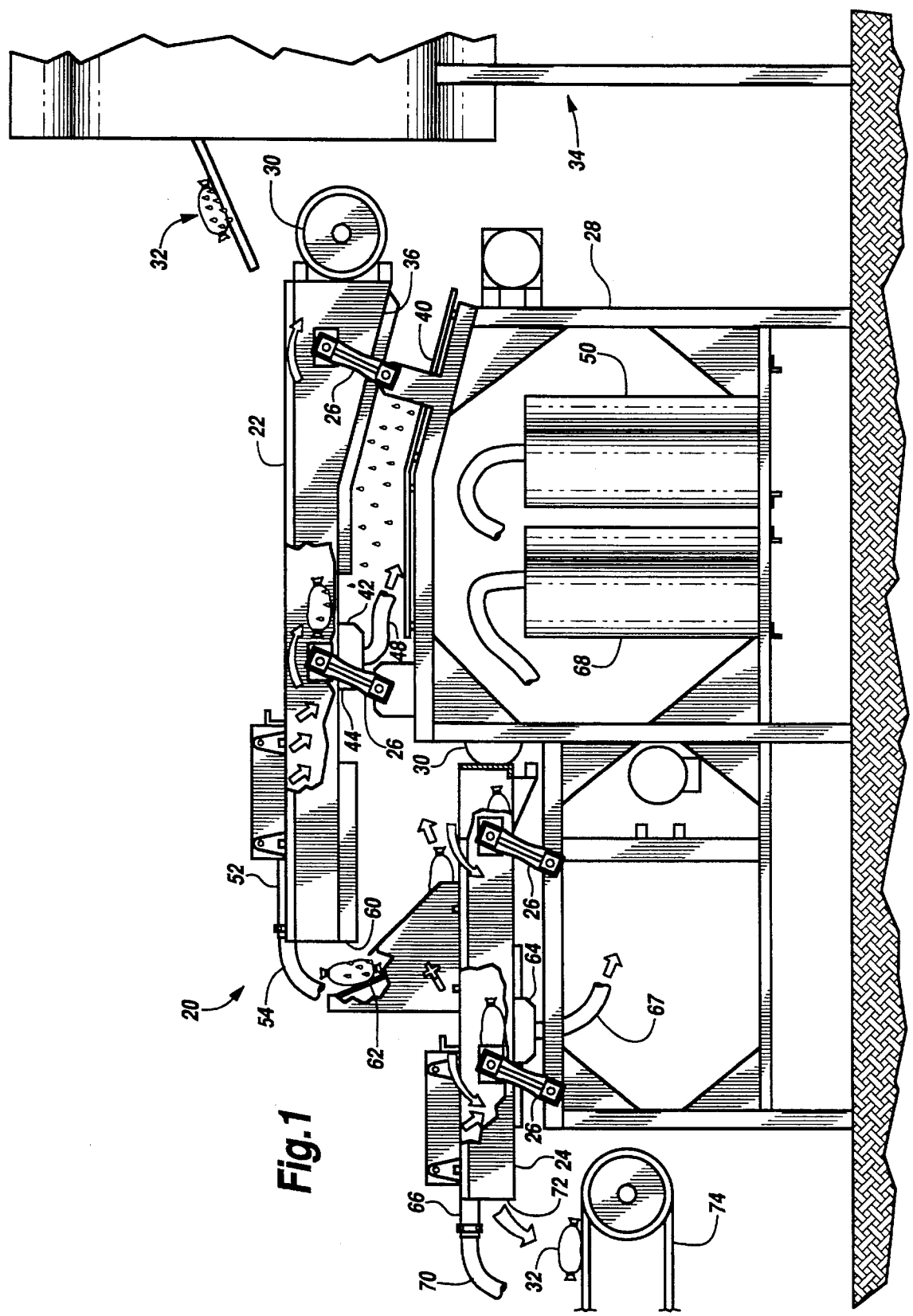
FIG. 1 is a side elevational view of the moisture removal apparatus of this invention, partially cut away in section to reveal food product pouches progressing from a wet to a dry state.

Referring more particularly to FIGS. 1–4, wherein like numbers refer to similar parts, a water removal apparatus 20 for food product pouches is shown in FIG. 1. The apparatus has an upper tray 22 and a lower tray 24 which are mounted by links 26 to a rigid tubular steel frame 28. The links 26 permit reciprocal vibratory motion of the trays 24, 26 with respect to the frame 28. An eccentric drive 30 is mounted to each tray 22, 24, for example the Ajax eccentric drive manufactured by Ronold Inc., of Westfield, Wisconsin. When activated the eccentric drives 30 provide a means for vibrating the trays 24, 26, and hence for advancing pouches 32 downstream along each tray.

Each bag or pouch 32 is typically formed of a plastic membrane which is sealed with a clip at each end. A pouch may be as small as one inch long, or over a foot in length, depending on the volume to be contained therein.

Pouches 32 are discharged in a stream from a food processing apparatus 34, for example a rotating drum water bath cooler. The pouches leaving the water bath have moisture adhering to the plastic surface of the pouch 32. It is the purpose of the apparatus to remove this moisture prior to final disposition of the pouch 32. Preferably, up to 95 percent of the moisture will be removed, although the levels of moisture removal will vary depending on the size and other attributes of the pouch as well as the volumes of air employed.

The pouches 32 are received in the upper tray 22 at an upwardly inclined inlet section 36. This incline retards progress of the pouches in response to the vibration of the tray, and serves to space the pouches from one another in the downstream direction. This retardation insures that the pouches are separated from one another and do not overlap.

Figure 2:
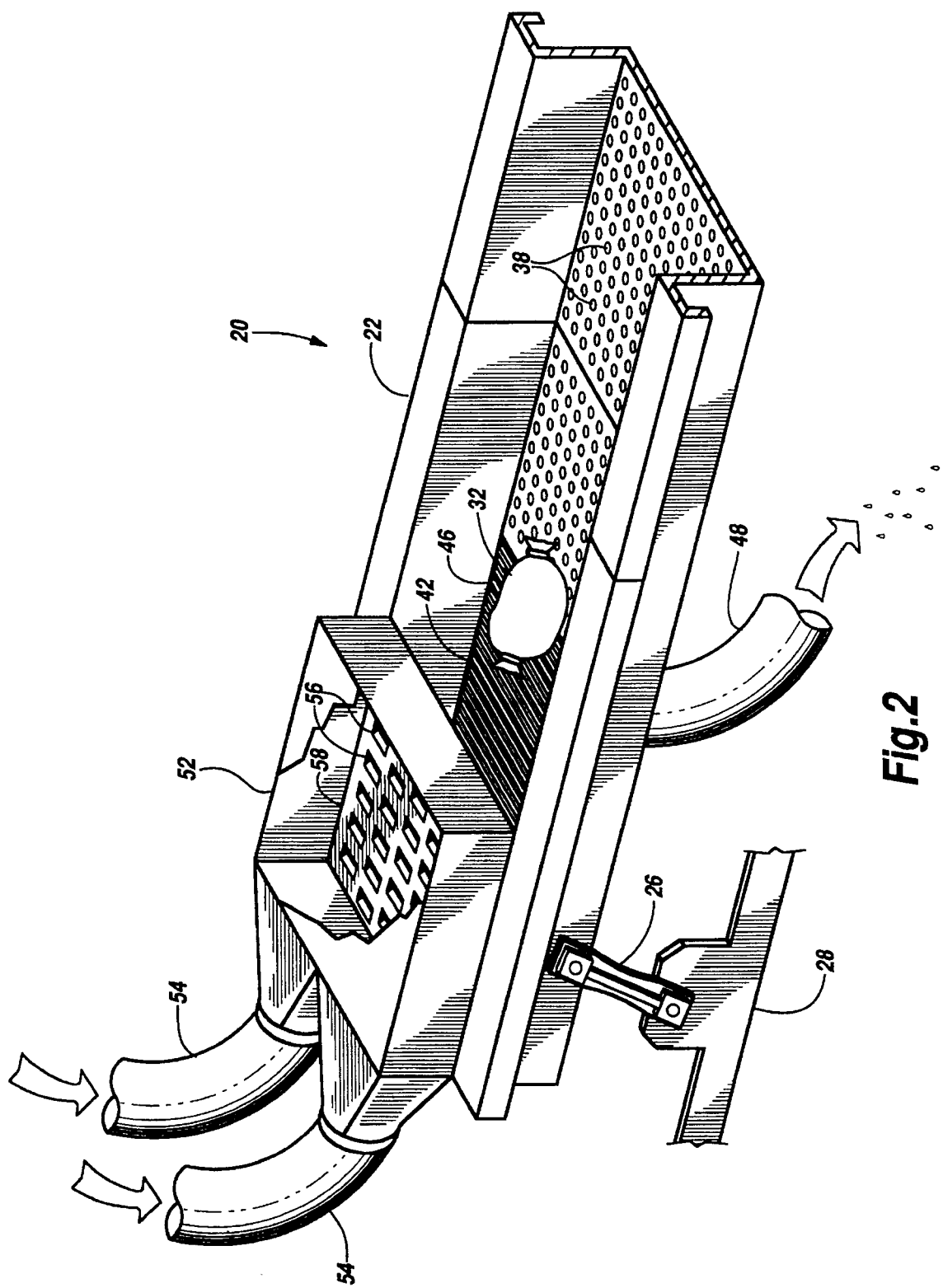
FIG. 2 is a fragmentary isometric view, partially cut away, of the upper tray and air manifold of the apparatus of FIG. 1.
Figure 3:
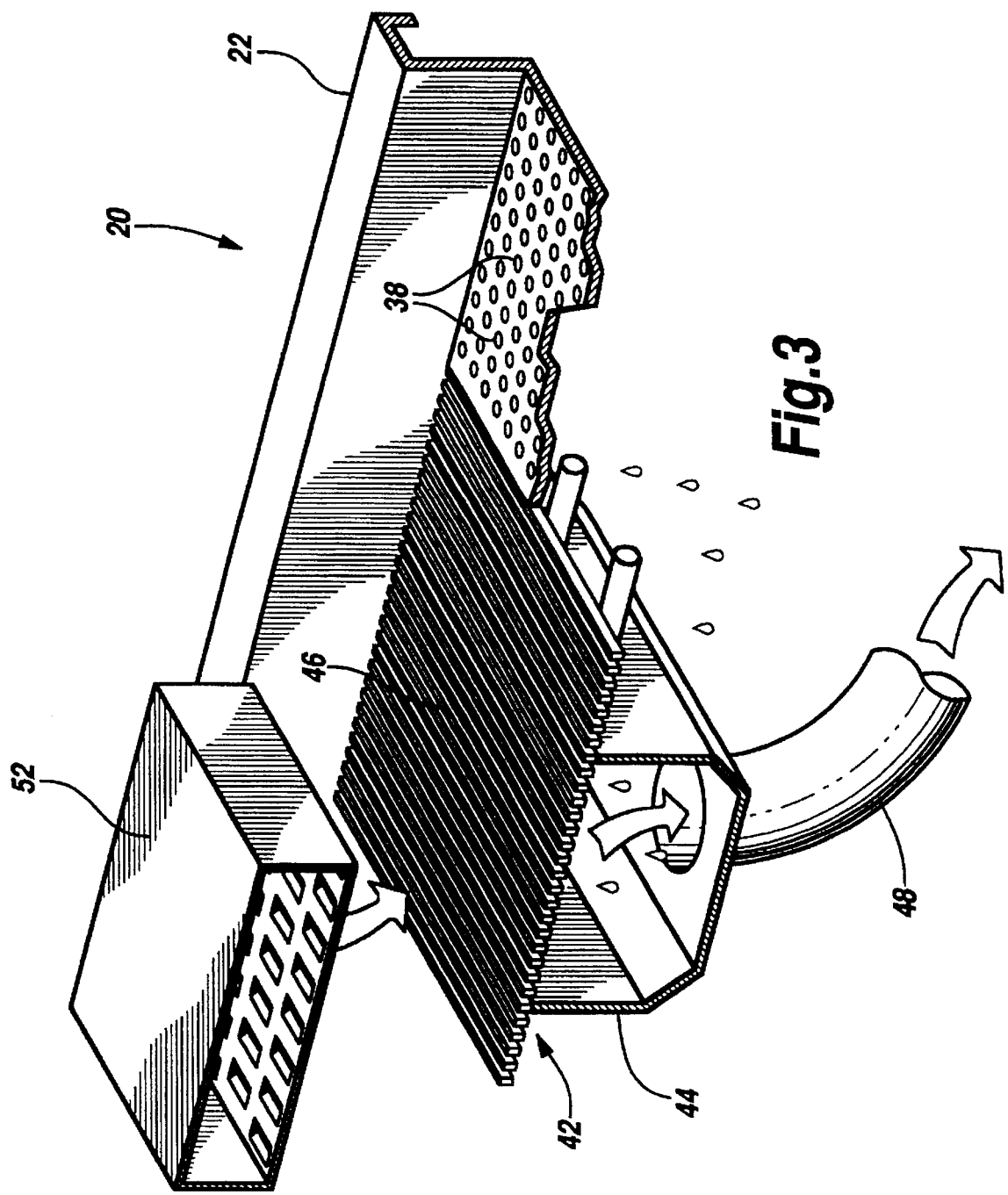
FIG. 3 is an enlarged fragmentary isometric view, partially cut away, of the air manifold and air outlet of the apparatus of FIG. 2.

As shown in FIGS. 2 and 3, the lower surface of the upper tray 22 has an array of perforations 38, which permits some water which is shaken from the pouch by the vibration of the tray to pass through the upper tray onto a runoff surface 40 on the frame for collection in a runoff collection drain (not shown).

The vibration of the upper tray 22 advances the pouches, now spaced from one another, to pass one by one over a vacuum air outlet 42, best shown in FIG. 3. The vacuum air outlet 42 is defined by an air box 44 which is overlain by a linear screen of wedge wire 46. An air hose 48 is connected to the air box 44, and air is drawn through the air hose 48 into an air and water filter 50. Once the water is filtered from the air it is recirculated to the air manifold 52 which is disposed downstream of and above the air outlet 42.

The air manifold 52 is a box which is removably connected to the upper tray 22, and which is preferably supplied by two air supply hoses 54, each of which is connected to an air pump (not shown). A flow of air, preferably in the range of 388 cubic feet per minute, is blown into the manifold 52. As shown in FIG. 2, an array of louvers 56 is formed in the lower wall 58 of the manifold 52. The louvers 56 are rectangular tabs which are angled upstream to direct the air flow toward the air outlet 42 in the upper tray 22. The flow of air from the manifold 52 is drawn to the lower pressure region created in the air box 44, and sets up a directional flow of air through which the pouches 32 pass in sequence. When the air blast hits a pouch, water adhered to the surface thereof is blown from the pouch. Without the negative pressure air outlet beneath the pouch, there would be a tendency for the air and entrained water to be blown upstream onto the successive pouch. However, the directional flow of the air into the air outlet insures that the majority of the air and removed water is taken away from the tray and not deposited on a pouch up the line.

Furthermore, because each pouch has a large surface area, there is a tendency for a blast of air to urge the pouch upstream, possibly overcoming the vibration of the tray 22. However, the air outlet in the upper tray 22 overcomes this tendency by tending to hold the pouch in contact with the wedge wire as it traverses the air outlet 42 and passes beyond the flow of air from the air manifold 52.

Figure 4:
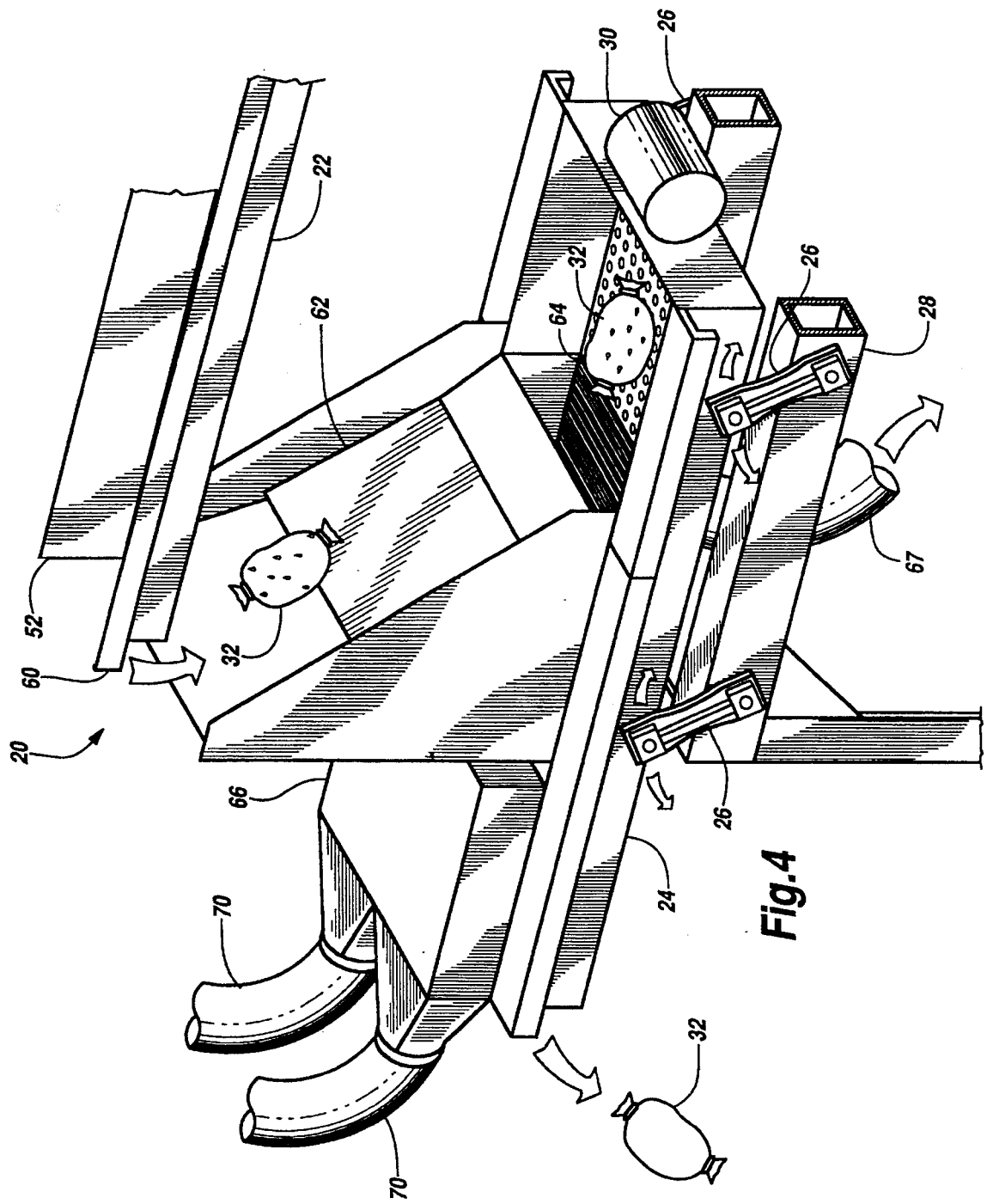
FIG. 4 is a fragmentary isometric view of the bag flipping structure mounted to the lower tray of the apparatus of FIG. 1.

As shown in FIG. 4, once the moisture has been removed from the upper surface of a pouch it is progressed to the outlet 60 of the upper tray and is discharged into a means for flipping the pouch to expose its underside. The flipping means preferably comprises a three surface segmented angled ramp 62 onto which the pouch drops from the outlet 60 of the upper tray, with the dried surface engaging the ramp 62. The pouch 32 slides along the ramp 62 and is discharged onto the lower tray 24. The lower tray is also being vibrated by an eccentric drive 30 which advances the pouch, with its wet side up, over a second air outlet 64, shown in FIG. 1. The second air outlet 64 is positioned in advance of a second air manifold 66. The second air outlet 64 is connected to an air hose 67 which draws air from the outlet and into a second air falter 68 for recirculation. The second manifold 66 is substantially identical to the upper tray manifold 52, and is supplied by two air hoses 70 from air pumps or compressors which are not shown.

The pouch is subjected to a flow of air in a manner similar to that experienced on the upper tray 22, and is than advanced along the lower tray 24 to be discharged at the machine outlet 72 onto a conveyor 74 or into a carton or other destination package.

It should be noted that the apparatus 20 may be provided with a greater or lesser number of air pumps and manifold louvers, and that the number and positioning of the vacuum air outlets may be varied.

It is understood that the invention is not limited to the particular construction and arrangement of parts herein illustrated and described, but embraces such modified forms thereof as come within the scope of the following claims.

We claim:

1. An apparatus for removing surface moisture from food product pouches, the apparatus comprising:

a) a rigid frame;

b) a first tray connected to the frame for oscillatory motion;

c) means for vibrating the tray with respect to the frame to induce vibratory motion to advance pouches supported thereon downstream;

d) a first manifold disposed above the first tray; wherein air is discharged through the first manifold onto the first tray; and e) portions of the first tray which define an air outlet through which air is drawn beneath the first manifold, such that a pouch traversing the first tray will pass over the air outlet and be subjected to air discharged from the first manifold, thereby removing moisture from a surface of the pouch, and wherein the air and moisture are drawn through the air outlet to restrict upstream movement of said pouch.

2. The apparatus of claim 1 further comprising:

a second tray connected to the frame for oscillatory motion, wherein the second tray is positioned with respect to the first tray to receive a pouch discharged therefrom;

b) means for flipping a pouch discharged from the first tray, such that the surface which was exposed to air discharge on the first tray is in contact with the second tray;

c) a second manifold disposed above the second tray, wherein air is discharged through the second manifold onto the second tray; and d) portions of the second tray which define a second air outlet through which air is drawn beneath the second manifold, such that a pouch traversing the second tray will pass over the air outlet and be subjected to air discharged from the second manifold.

3. The apparatus of claim 1 wherein the first manifold is a box which is connected to the first tray, the box having a lower wall with an array of louvers formed therein, the louvers being angled upstream to direct air flow toward the first tray air outlet.

4. The apparatus of claim 1 wherein the means for vibrating the tray with respect to the frame comprises an eccentric drive.

5. The apparatus of claim 1 wherein the first tray has an upwardly inclined inlet section which retards progress of the pouches in response to the vibration of the tray, and serves to space the pouches from one another in the downstream direction, the retardation thereby serving to separate the pouches from one another so as not to overlap.

* * * * *